US011879549B2

(12) United States Patent
Ishijima et al.

(10) Patent No.: US 11,879,549 B2
(45) Date of Patent: Jan. 23, 2024

(54) ROTARY JOINT

(71) Applicant: NIPPON PILLAR PACKING CO., LTD., Osaka (JP)

(72) Inventors: Masanao Ishijima, Osaka (JP); Osamu Suzuki, Osaka (JP); Yasuyuki Okunishi, Osaka (JP); Shuhei Matsui, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 46 days.

(21) Appl. No.: 17/611,294

(22) PCT Filed: Apr. 17, 2020

(86) PCT No.: PCT/JP2020/016954
§ 371 (c)(1),
(2) Date: Nov. 15, 2021

(87) PCT Pub. No.: WO2020/235278
PCT Pub. Date: Nov. 26, 2020

(65) Prior Publication Data
US 2022/0205541 A1    Jun. 30, 2022

(30) Foreign Application Priority Data
May 17, 2019  (JP) ................................. 2019-093548

(51) Int. Cl.
F16J 15/34       (2006.01)
F16L 27/087      (2006.01)

(52) U.S. Cl.
CPC ......... *F16J 15/3404* (2013.01); *F16L 27/087* (2013.01)

(58) Field of Classification Search
CPC ........ F16J 15/34; F16J 15/3404; F16J 15/002; F16J 15/004; F16J 15/006; F16J 15/3484; F16L 27/087
See application file for complete search history.

(56) References Cited

U.S. PATENT DOCUMENTS 3,503,469 A  *  3/1970  Renz et al. ............... F16N 7/00
                                                    184/5
4,408,766 A     10/1983  Paech
(Continued)

FOREIGN PATENT DOCUMENTS

JP    S55-10116 A    1/1980
JP    S59-231269 A   12/1984
(Continued)

OTHER PUBLICATIONS

International Search Report for PCT/JP2020/016954 dated Jul. 21, 2020.
(Continued)

*Primary Examiner* — Gilbert Y Lee
(74) *Attorney, Agent, or Firm* — Millen, White, Zelano & Branigan, P.C.; William F. Nixon

(57) ABSTRACT

Each of mechanical seal devices 7 of a rotary joint 1 includes a first shaft side seal ring 71 and a second shaft side seal ring 72 attached to a shaft body 5, and a first case side seal ring 73 and a second case side seal ring 74 attached to a case body 2. The first shaft side seal ring 71 and the second shaft side seal ring 72 have contact surfaces 71*b* and 72*b* axially facing each other and coming into contact with each other, and grooves 421*c* and 421*d* for forming a second communication flow passage 42 connecting a second outer flow passage 32 and a second inner flow passage 62 are formed in both the contact surfaces 71*b* and 72*b*.

5 Claims, 9 Drawing Sheets

(56) References Cited

U.S. PATENT DOCUMENTS

| | | | |
|---|---|---|---|
| 7,938,404 B2 * | 5/2011 | Hagen | F16J 15/004 277/408 |
| 2001/0052676 A1 | 12/2001 | Omiya et al. | |
| 2009/0302546 A1 * | 12/2009 | Takahashi | F16J 15/3404 277/408 |
| 2010/0327533 A1 * | 12/2010 | Akiyama | F16J 15/006 277/348 |
| 2012/0326394 A1 * | 12/2012 | Hashimoto | F16J 15/3404 277/359 |
| 2017/0051857 A1 * | 2/2017 | Sakakura | F16L 39/04 |

FOREIGN PATENT DOCUMENTS

| | | |
|---|---|---|
| JP | H01-168090 U1 | 11/1989 |
| JP | H02-74691 U1 | 6/1990 |
| JP | H05-322050 A | 12/1993 |
| JP | 2002-005380 A | 1/2002 |
| JP | 2012-097761 A | 5/2012 |

OTHER PUBLICATIONS

English Machine Translation for JP-2012-097761, Publication Date: May 24, 2012.

English Machine Translation for JPH0274691, Publication Date: Jun. 7, 1990.

English Machine Translation for JPS5510116, Publication Date: Jan. 24, 1980.

English Machine Translation for JPS59231269, Publication Date: Dec. 25, 1984.

English Machine Translation for 05322050, Publication Date: Dec. 17, 1993.

English Machine Translation for JPH01168090, Publication Date: Nov. 27, 1989.

* cited by examiner

ROTARY JOINT

TECHNICAL FIELD

The present invention relates to a rotary joint.

BACKGROUND ART

A rotary joint is used to connect a flow passage of a fixed side member and a flow passage of a rotating side member to each other. For example, in a chemical mechanical polishing device (CMP device) used to perform surface polishing treatment of a semiconductor wafer, polishing liquid, pressurizing air, washing water, pure water, air blowing air, polishing residual liquid, etc. flows as a sealed fluid between a rotating side member (a turntable or a top ring) and a fixed side member (a main body of the CMP device) supporting the rotating side member. A plurality of independent fluid passages is used for a joint portion that connects between the rotating side member and the fixed side member to allow the sealed fluid to flow between the rotating side member and the fixed side member without mixing. Therefore, for example, a multi-port type rotary joint disclosed in Patent Literature 1 is used as the joint portion.

The rotary joint of Patent Literature 1 includes a tubular case body, a rotating body rotatably provided in the case body, and a plurality of mechanical seals provided side by side in an axial direction in an annular space between the case body and the rotating body. A plurality of case body side passages penetrating in a radial direction is formed in the case body. In the rotating body, the same number of rotating body side passages as the number of case body side passages are formed to open on an outer circumferential side of the rotating body.

Each of the mechanical seals includes a static seal ring attached to the case body and a rotary seal ring that rotates integrally with the rotating body, and the rotary seal ring slides with respect to the static seal ring. A sleeve is fit onto and fixed to the rotating body between rotary seal rings adjacent to each other in the axial direction, and a through-hole for configuring a communication flow passage connecting one case body side passage and one rotating body side passage is formed in this sleeve.

CITATION LIST

Patent Literature

Patent Literature 1: JP 2012-97761 A

SUMMARY OF INVENTION

Technical Problem

In the rotary joint, the sleeve in which the through-hole for configuring the communication flow passage is formed needs to be disposed between rotary seal rings adjacent to each other in the axial direction. For this reason, when the number of communication flow passages (number of ports) increases, the total length of the rotary joint in the axial direction becomes long, and there is a problem that the rotary joint cannot be mounted depending on the CMP device.

In order to solve the problem, it is conceivable to remove the sleeve and process one of the rotary seal rings to form a through-hole. However, in this case, since the process for forming the through-hole in the rotary seal ring is needed, when a material of the rotary seal ring is a difficult-to-process material such as silicon carbide (SiC), the processing accuracy of the through-hole tends to vary.

The invention has been made in view of such circumstances, and an object of the invention is to provide a rotary joint capable of suppressing an increase in the total length in the axial direction even when the number of ports increases and suppressing occurrence of variation in processing accuracy of the ports.

Solution to Problem (1) A rotary joint of the invention includes a tubular case body in which a plurality of outer flow passages is formed by opening on an inner circumferential side, a sealed fluid flowing through the outer flow passages, a shaft body relatively rotatably provided in the case body, a plurality of inner flow passages through which a sealed fluid flows being formed therein by opening on an outer circumferential side, and a plurality of mechanical seal devices disposed side by side in an axial direction in an annular space formed between the case body and the shaft body, in which each of the mechanical seal devices includes a first case side seal ring attached to the case body, a first shaft side seal ring attached adjacent to one side of the first case side seal ring in the axial direction in the shaft body to slide relative to the first case side seal ring, a second shaft side seal ring attached adjacent to one side of the first shaft side seal ring in the axial direction in the shaft body, and a second case side seal ring attached adjacent to one side of the second shaft side seal ring in the axial direction in the case body to slide relative to the second shaft side seal ring, the first shaft side seal ring and the second shaft side seal ring have contact surfaces facing in the axial direction and coming into contact with each other, and a groove for forming a communication flow passage connecting one of the outer flow passages and one of the inner flow passages is formed on at least one of the both contact surfaces of the first shaft side seal ring and the second shaft side seal ring.

In the rotary joint configured as described above, the first shaft side seal ring and the second shaft side seal ring of each mechanical seal device have the contact surfaces facing in the axial direction and coming into contact with each other, and the groove for forming the communication flow passage connecting one of the outer flow passages and one of the inner flow passages is formed on at least one of these contact surfaces. In this way, since it is unnecessary to provide a sleeve in which a through-hole is formed between the first shaft side seal ring and the second shaft side seal ring as in the conventional case, even when the number of communication flow passages (the number of ports) increases, it is possible to suppress an increase in the total length in the axial direction. Further, since the shaft side seal rings having the contact surfaces on which the groove is formed can be molded by a mold, respectively, the variation in the processing accuracy of the groove can be suppressed.

(2) It is preferable that the groove is formed on each of the both contact surfaces.

In this case, one flow passage can be formed by disposing the grooves formed on the both contact surfaces, respectively, at positions facing each other, or a flow passage can be formed for each groove by disposing the grooves at positions not facing each other. Therefore, it is possible to increase a degree of freedom in forming the communication flow passage.

(3) When the sealed fluid is a gas, it is preferable that the grooves formed on the both contact surfaces, respectively, are disposed at positions not facing each other.

When the sealed fluid is a gas, sliding between the first shaft side seal ring and the first case side seal ring and sliding between the second shaft side seal ring and the second case side seal ring become dry sliding, and these sliding portions easily generate heat. On the other hand, in item (3) above, since the flow passage is formed for each groove by disposing the grooves formed on the both contact surfaces, respectively, at positions not facing each other, more flow passages can be formed when compared to a case where the grooves are disposed at positions facing each other. In this way, since the first shaft side seal ring and the second shaft side seal ring can be effectively cooled by the gas (sealed fluid) passing through the flow passage formed for each of the grooves, it is possible to effectively suppress heat generation of the sliding portions.

(4) When the sealed fluid is a liquid, it is preferable that the grooves formed on the both contact surfaces, respectively, are disposed at positions facing each other.

When the sealed fluid is a liquid, the pressure loss of the liquid flowing through the communication flow passage becomes large. On the other hand, in item (4) above, since the grooves formed on the both contact surfaces, respectively, are disposed at positions facing each other, so that these grooves mutually form one large flow passage, it is possible to increase the area of the wetting surface of the flow passage. In this way, it is possible to suppress the pressure loss of the fluid flowing through the communication flow passage.

(5) It is preferable that a circumferential groove for forming the communication flow passage is formed on the contact surface. Here, the circumferential groove communicates with the one of the inner flow passages on the inner circumferential side and communicates with the groove on the outer circumferential side.

In this case, even when the one inner flow passage and the groove are disposed so as to be shifted from each other in the circumferential direction, the one inner flow passage and the groove can be reliably allowed to communicate with each other by the circumferential groove.

(6) It is preferable that a plurality of grooves is formed in a circumferential direction of the contact surface, and an outer circumferential side of the circumferential groove communicates with the plurality of grooves.

In this case, the plurality of grooves formed in the circumferential direction of the contact surface can be allowed to communicate with the one inner flow passage via the circumferential groove.

Advantageous Effects of Invention

According to a rotary joint of the invention, it is possible to suppress an increase in the total length in the axial direction even when the number of ports increases and suppress occurrence of variation in processing accuracy of the ports.

DESCRIPTION OF EMBODIMENTS

Next, preferred embodiments of the invention will be described with reference to the accompanying drawings.

First Embodiment

<Overall Configuration>

Figure 1:
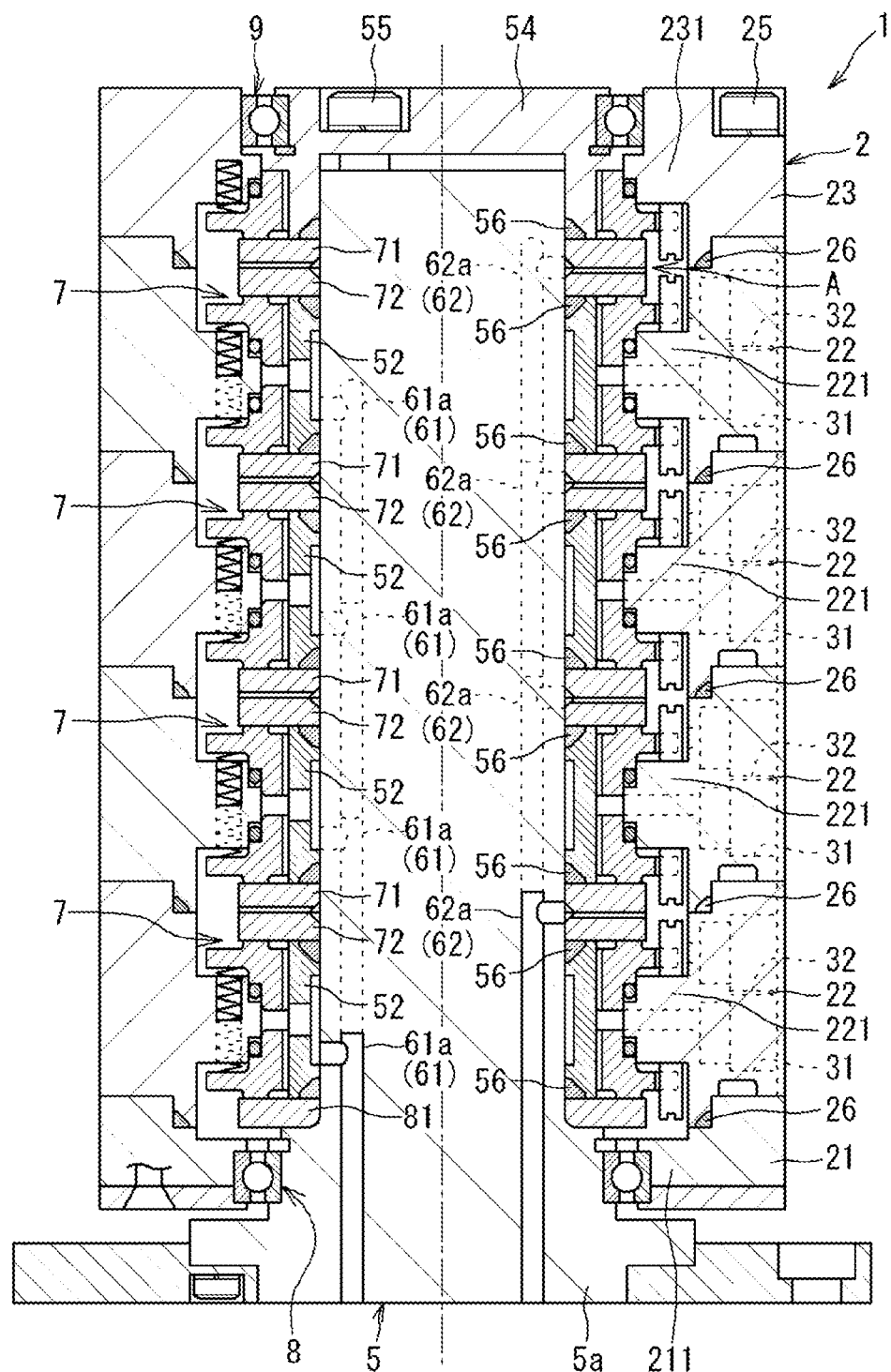
FIG. 1 is a cross-sectional view illustrating a rotary joint according to a first embodiment of the invention.

FIG. 1 is a cross-sectional view illustrating a rotary joint according to a first embodiment of the invention. A rotary joint 1 (hereinafter also referred to as a joint 1) includes a tubular case body 2 attached to a fixed side member (for example, a main body of a CMP device) of a rotating machine, and a shaft body 5 attached to a rotating side member (for example, a turntable of the CMP device) of the rotating machine. The case body 2 and the shaft body 5 of the present embodiment are disposed with an axial direction as a vertical direction.

Note that in the invention, the "axial direction" is a direction along a center line of the joint 1 (including a direction parallel to the center line). Respective center lines of the case body 2, the shaft body 5, and a mechanical seal device 7 described below are configured to coincide with the center line of the joint 1. In addition, in the invention, a "radial direction" refers to a direction orthogonal to the center line of the joint 1, and "circumferential direction" refers to a direction around the center line of the joint 1. In addition, a posture of the joint 1 may correspond to a posture other than a posture illustrated in FIG. 1. For convenience of description, in the present embodiment, an upper side illustrated in FIG. 1 is set to "top" of the joint 1, and a lower side is set to "bottom" of the joint 1.

<Case Body>

The case body 2 is configured by stacking a lower flange 21, a plurality of (four in the illustrated example) flow passage flanges 22, and an upper flange 23 in this order from the bottom. Each of the flanges 21 to 23 is formed in an annular shape, and all the flanges 21 to 23 are connected and fixed by a plurality of bolts 25 (only one is illustrated in FIG. 1). In this way, the case body 2 becomes a tubular structure as a whole.

O-rings 26 are provided between the lower flange 21 and a flow passage flange 22 adjacent to each other, between flow passage flanges 22 adjacent to each other, and between a flow passage flange 22 and the upper flange 23 adjacent to each other, respectively.

The respective flanges 21, 22, and 23 have annular protrusions 211, 221, and 231 protruding inward in the radial direction, respectively. A first outer flow passage 31 through which a sealed fluid flows is formed in a protrusion 221 of each of the plurality of flow passage flanges 22 to penetrate the protrusion 221 in the radial direction. In addition, a second outer flow passage 32 through which a sealed fluid flows is formed in a portion of each of the plurality of flow passage flanges 22 excluding the protrusion 221 to penetrate the portion in the radial direction. As the sealed fluid of the present embodiment, for example, pressurizing air, inert gas such as nitrogen, gas such as air blowing air, etc. are used.

The respective outer flow passages 31 and 32 are open on the inner circumferential side and the outer circumferential side of the flow passage flange 22. An opening of the flow passage flange 22 on the outer circumferential side serves as a connection port to which each of a plurality of pipes of the fixed side member is connected.

As described above, a plurality of first outer flow passages 31 and a plurality of second outer flow passages 32 through which the sealed fluid flows are alternately formed at predetermined intervals along the axial direction in the case body 2.

<Shaft Body>

The shaft body 5 is disposed on the inner circumferential side of the case body 2. A plurality of sleeves 52 (four in the illustrated example) is fit to the shaft body 5. Further, a first shaft side seal ring 71 and a second shaft side seal ring 72, which will be described later, are fit to the shaft body 5. Note that in the present embodiment, the first shaft side seal ring 71 and the second shaft side seal ring 72 are also simply referred to as shaft side seal rings 71 and 72. The shaft side seal rings 71 and 72 are disposed between sleeves 52 disposed one above the other. A third shaft side seal ring 81, which will be described later, is disposed on the lower side of the sleeve 52 disposed at a lowermost portion. Note that in the present embodiment, the third shaft side seal ring 81 is also simply referred to as a shaft side seal ring 81. The shaft side seal ring 81 is fit to the shaft body 5.

A pressing member 54 is fixed above the shaft body 5 by a bolt 55. Further, a large diameter portion 5a having a diameter larger than that of other portions is formed at a lower end portion of the shaft body 5. The large diameter portion 5a regulates downward movement of the sleeves 52 and the shaft side seal rings 71, 72, and 81 fit to the shaft body 5.

O-rings 56 are provided between the shaft body 5, the sleeve 52, and the shaft side seal ring 71 (72, 81), and between the shaft body 5, the lower end portion of the pressing member 54, and the shaft side seal ring 71, respectively. The O-rings 56 prevent the sealed fluid flowing through a first inner flow passage 61 and a second inner flow passage 62, which will be described later, from entering another flow passage or leaking to the outside.

A rolling bearing 8 is provided between the large diameter portion 5a of the shaft body 5 and the lower flange 21, and a rolling bearing 9 is provided between the pressing member 54 and the upper flange 23. As a result, the shaft body 5 is rotatably supported with respect to the case body 2 together with the pressing member 54 and the shaft side seal rings 71, 72, and 81.

A plurality of (four in the illustrated example) flow passage holes 61a and a plurality of (four in the illustrated example) flow passage holes 62a are formed in the shaft body 5. An upper end side of each of the plurality of flow passage holes 61a and 62a is open at a different position in the axial direction (vertical direction) on an outer circumferential surface of the shaft body 5. A lower end side of each of the plurality of flow passage holes 61a and 62a is open on an end surface (lower end surface) of the shaft body 5, and a plurality of pipes of the rotating side member is connected to openings on the end surface, respectively.

Each flow passage hole 61a in the shaft body 5 is included in the first inner flow passage 61 through which the sealed fluid flows. Each flow passage hole 62a in the shaft body 5 is included in the second inner flow passage 62 through which the sealed fluid flows. As described above, on the outer circumferential side of the shaft body 5, a plurality of (four) first inner flow passages 61 and a plurality of (four) second inner flow passages 62 are formed by opening at different positions in the axial direction.

<Mechanical Seal Device>

An annular space A is formed between the case body 2 and the shaft body 5, and a plurality of (four in the illustrated example) mechanical seal devices 7 is disposed side by side in an axial direction in the annular space A. In this way, the joint 1 of the present embodiment is a multi-flow passage rotary joint obtained by disposing the plurality of mechanical seal devices 7 in the axial direction of the annular space A.

Figure 2:
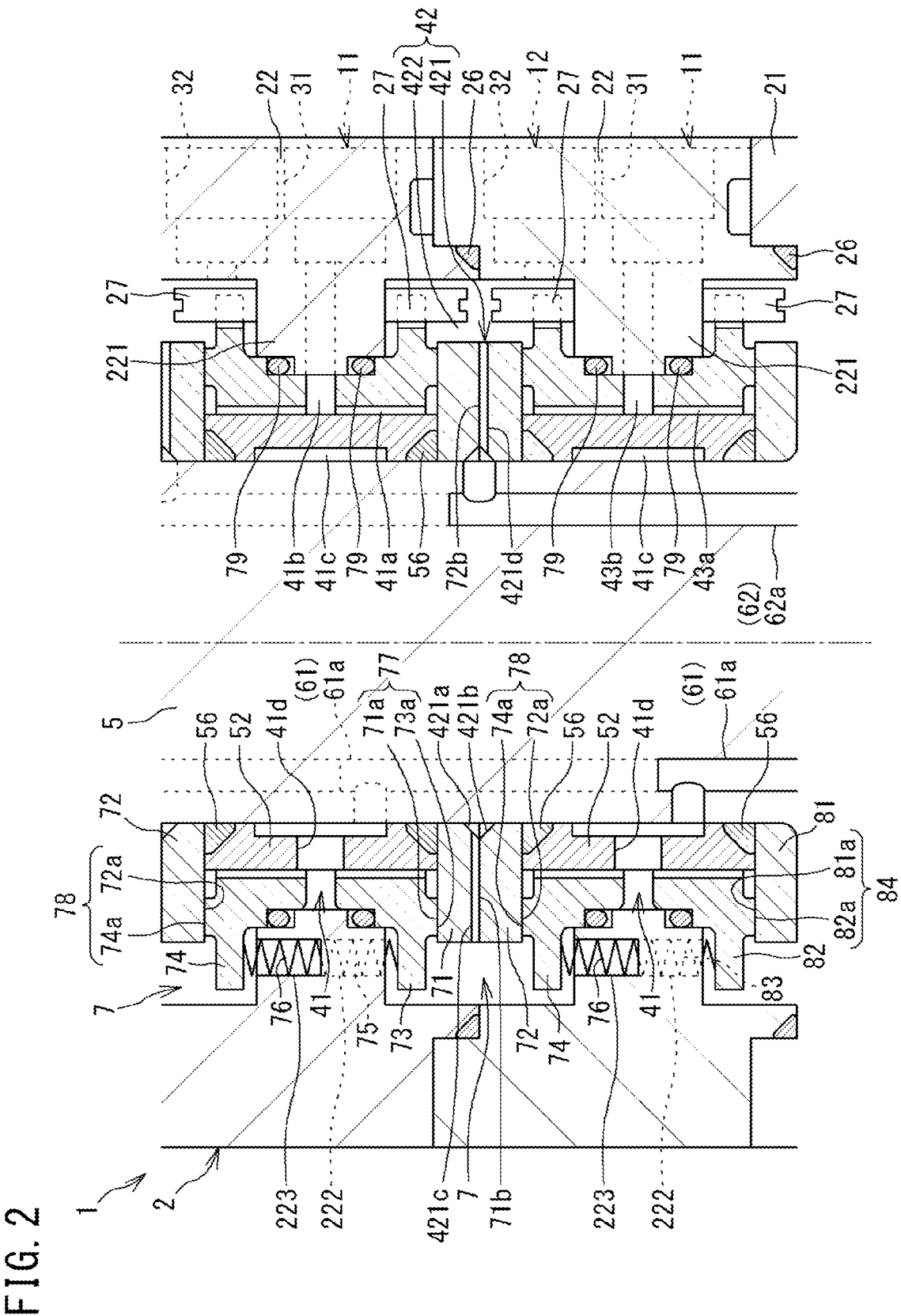
FIG. 2 is an enlarged cross-sectional view illustrating a lower side of the rotary joint.

FIG. 2 is an enlarged cross-sectional view illustrating a lower side of the joint 1. In FIG. 2, each of the mechanical seal devices 7 includes the first shaft side seal ring 71 and the second shaft side seal ring 72 attached to the shaft body 5, a first case side seal ring 73 and a second case side seal ring 74 attached to the case body 2, and a first coil spring 75 and a second coil spring 76 as press members.

Each of the shaft side seal rings 71 and 72 is made of, for example, an annular member molded by a mold with silicon carbide (SiC) having excellent wear resistance and sealing performance. As described above, each of the shaft side seal rings 71 and 72 is integrally rotatably provided on the shaft body 5 and functions as a rotary seal ring. The end surfaces of the first shaft side seal ring 71 and the second shaft side seal ring 72 facing each other in the axial direction are regarded as contact surfaces 71b and 72b where these end surfaces come into contact with each other. An annular sealing surface 71a is formed on an upper end surface of the first shaft side seal ring 71 (the end surface opposite to the contact surface 71b). An annular sealing surface 72a is formed on a lower end surface of the second shaft side seal ring 72 (the end surface opposite to the contact surface 72b).

Each of the case side seal rings 73 and 74 is made of an annular member. The first case side seal ring 73 is disposed adjacent to an upper side of the first shaft side seal ring 71. The second case side seal ring 74 is disposed adjacent to a lower side of the second shaft side seal ring 72.

A radial outer end portion of each of the case side seal rings 73 and 74 is in contact with a pin 27 that protrudes in the axial direction (vertical direction) and is fixed at the protrusion 221 of the flow passage flange 22. In this way, each of the case side seal rings 73 and 74 is stopped by the case body 2 and functions as a static seal ring.

An annular sealing surface 73a in contact with the sealing surface 71a of the first shaft side seal ring 71 is formed on a lower end surface of the first case side seal ring 73. An annular sealing surface 74a in contact with the sealing surface 72a of the second shaft side seal ring 72 is formed on an upper end surface of the second case side seal ring 74.

At the protrusion 221 of the corresponding flow passage flange 22, the first coil spring 75 is inserted into a plurality of insertion holes 222 (only one is illustrated in the figure) formed in the circumferential direction in a compressed state. One end portion of the first coil spring 75 is in contact with the first case side seal ring 73. In this way, due to an elastic restoring force of the first coil spring 75, the first case side seal ring 73 is pressed downward toward the first shaft side seal ring 71 side, and a pressing force in the axial direction acts between both the sealing surfaces 71a and 73a. Note that in addition to the first coil spring 75, another press member may be used.

At the protrusion 221 of the corresponding flow passage flange 22, the second coil spring 76 is inserted into a plurality of insertion holes 223 (only one is illustrated in the figure) formed in the circumferential direction in a compressed state. One end portion of the second coil spring 76 is in contact with the second case side seal ring 74. In this way, due to an elastic restoring force of the second coil spring 76, the second case side seal ring 74 is pressed upward toward the second shaft side seal ring 72 side, and a pressing force in the axial direction acts between both the sealing surfaces 72a and 74a. Note that in addition to the second coil spring 76, another press member may be used.

As described above, as the shaft body 5 rotates with respect to the case body 2, the sealing surfaces 71a and 73a of the first shaft side seal ring 71 and the first case side seal ring 73 slide with each other in a state of being pressed in the axial direction. By sliding the sealing surfaces 71a and 73a together, a sealing function for preventing the sealed fluid from leaking from between both the sealing surfaces 71a and 73a is exhibited.

Similarly, as the shaft body 5 rotates with respect to the case body 2, the sealing surfaces 72a and 74a of the second shaft side seal ring 72 and the second case side seal ring 74 slide with each other in a state of being pressed in the axial direction. By sliding the sealing surfaces 72a and 74a together, a sealing function for preventing the sealed fluid from leaking from between both the sealing surfaces 72a and 74a is exhibited.

Therefore, a sealing function of the mechanical seal device 7 is exhibited by a sliding action associated with relative rotation between the sealing surface 71a of the first shaft side seal ring 71 and the sealing surface 73a of the first case side seal ring 73 and a sliding action associated with relative rotation between the sealing surface 72a of the second shaft side seal ring 72 and the sealing surface 74a of the second case side seal ring 74. Hereinafter, a sliding portion between the sealing surfaces 71a and 73a is referred to as a first sliding portion 77, and a sliding portion between the sealing surfaces 72a and 74a is referred to as a second sliding portion 78.

<First Communication Flow Passage>

Of the mechanical seal devices 7 vertically adjacent to each other in the axial direction, the first case side seal ring 73 of the mechanical seal device 7 disposed on the lower side and the second case side seal ring 74 of the mechanical seal device 7 disposed on the upper side are provided with a gap between the case side seal rings 73 and 74 and the outer circumferential surface of the sleeve 52. In this way, a cylindrical gap flow passage 41a through which the sealed fluid flows is formed between the case side seal rings 73 and 74 adjacent to each other in the axial direction and the first sleeve 52. An annular flow passage 41b through which the sealed fluid flows is formed between the case side seal rings 73 and 74 adjacent to each other in the axial direction.

The annular flow passage 41b connects the gap flow passage 41a on the inner side in the radial direction and the first outer flow passage 31 on the outer side in the radial direction. An O-ring 79 is provided between the outer circumferential surface of each of the case side seal rings 73 and 74 adjacent to each other in the axial direction and an inner circumferential surface of the protrusion 221 of the flow passage flange 22. Note that each of the case side seal rings 73 and 74 is fit to the protrusion 221 via the O-ring 79 in a state of being movable in the axial direction.

The sleeve 52 is disposed at a position corresponding to the opening of each flow passage hole 61a of the shaft body 5. Further, the sleeve 52 has an annular gap 41c formed between the outer circumferential surface of the shaft body 5 and the sleeve 52 on the inner circumferential side thereof, and a plurality of (only one is illustrated in the figure) through-holes 41d formed at intervals in the circumferential direction. The gap 41c of each sleeve 52 communicates with the corresponding flow passage hole 61a on the inner circumferential side and communicates with the plurality of through-holes 41d on the outer circumferential side. Each through-hole 41d communicates with the gap flow passage 41a on the outer circumferential side.

As described above, the gap flow passage 41a, the annular flow passage 41b, the gap 41c, and the through-hole 41d between the mechanical seal devices 7 vertically adjacent to each other in the axial direction are included in a first communication flow passage 41 connecting the first outer flow passage 31 (excluding the first outer flow passage 31 at the lowermost portion) and the first inner flow passage 61 (excluding the first inner flow passage 61 at the lowermost portion). The sealed fluid in the first communication flow passage 41 does not leak to the outside by a sealing function of the first and second sliding portions 77 and 78 of the mechanical seal devices 7 vertically adjacent to each other in the axial direction, and a sealing function of O-rings 56 and 79. In this way, the first outer flow passage 31, the first communication flow passage 41, and the first inner flow passage 61 are included in one independent first fluid passage 11 through which the sealed fluid flows.

<Second Communication Flow Passage>

In each mechanical seal device 7, an annular flow passage 422 through which the sealed fluid flows is formed by partitioning the annular space A between the protrusion 221 of the flow passage flange 22 to which the first case side seal ring 73 is fit and the protrusion 221 of the flow passage flange 22 to which the second case side seal ring 74 is fit. The annular flow passage 422 communicates with the second outer flow passage 32 on the outer side in the radial direction.

A groove flow passage 421 through which the sealed fluid flows is formed between the first shaft side seal ring 71 and the second shaft side seal ring 72 of each mechanical seal device 7. The groove flow passage 421 communicates with the corresponding second inner flow passage 62 of the shaft body 5 on the inner circumferential side and communicates with the annular flow passage 422 on the outer circumferential side. The groove flow passage 421 has annular circumferential grooves 421a and 421b formed on the inner circumferential sides of the contact surfaces 71b and 72b of the shaft side seal rings 71 and 72, respectively, and grooves 421c and 421d formed on the outer circumferential sides of the circumferential grooves 421a and 421b on the contact surfaces 71b and 72b.

In the cross-sectional view illustrated in FIG. 2, each circumferential groove 421a (421b) is formed in a tapered shape so as to shrink in diameter as a distance from the contact surface 71b (72b) increases in the axial direction. Note that each circumferential groove 421a (421b) may be formed in another shape such as a step shape in the cross-sectional view.

Figure 3:
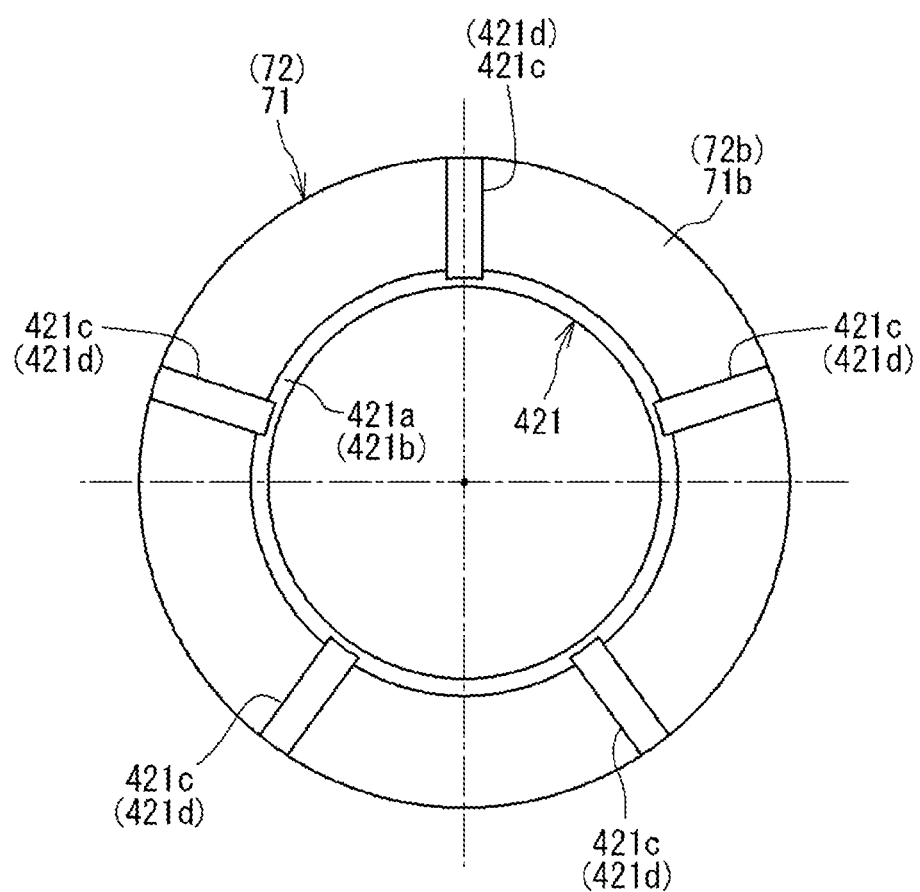
FIG. 3 is a front view of a shaft side seal ring viewed from a contact surface side.

FIG. 3 is a front view of the shaft side seal ring 71 (72) as viewed from the contact surface 71b (72b) side. In FIG. 3, a plurality of (five in the example) grooves 421c (421d) of the shaft side seal ring 71 (72) is formed at intervals in the circumferential direction of the contact surface 71*b* (72*b*). Each groove 421*c* (421*d*) is formed so as to extend in the radial direction.

A radial inner end of each groove 421*c* (421*d*) extends to the vicinity of an inner circumferential end of the contact surface 71*b* (72*b*) and communicates with the circumferential groove 421*a* (421*b*). A radial outer end of each groove 421*c* (421*d*) extends to an outer circumferential end of the contact surface 71*b* (72*b*) and communicates with the annular flow passage 422.

Figure 4:
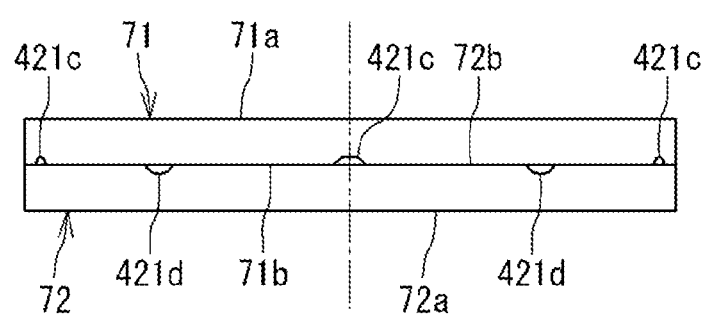
FIG. 4 is a plan view illustrating a state in which contact surfaces of shaft side seal rings of FIG. 3 are brought into contact with each other.

FIG. 4 is a plan view illustrating a state in which the contact surfaces 71*b* and 72*b* of the shaft side seal rings 71 and 72 of FIG. 3 are in contact with each other. For example, each groove 421*c* (421*d*) is formed in an arc shape in a plan view. Note that each groove 421*c* (421*d*) may be formed in another shape such as a V-shape in a plan view.

As illustrated in FIG. 2, the circumferential grooves 421*a* and 421*b* formed on the contact surfaces 71*b* and 72*b*, respectively, are disposed at positions facing each other. As illustrated in FIGS. 2 and 4, the grooves 421*c* and 421*d* formed on both the contact surfaces 71*b* and 72*b*, respectively, are disposed at positions not facing each other. Specifically, each groove 421*d* of the second shaft side seal ring 72 is disposed in the middle between the grooves 421*c* of the first shaft side seal ring 71 adjacent to each other in the circumferential direction.

In this way, the groove flow passage 421 of the present embodiment includes one flow passage formed by the circumferential grooves 421*a* and 421*b* facing each other, and a total of ten flow passages formed independently by each of five grooves 421*c* and five grooves 421*d*.

As described above, the groove flow passage 421 and the annular flow passage 422 formed in each mechanical seal device 7 are included in the second communication flow passage 42 connecting the second outer flow passage 32 and the second inner flow passage 62. The sealed fluid in the second communication flow passage 42 does not leak to the outside by the sealing function of the first sliding portion 77, the sealing function of the O-rings 56 and 79 disposed on the upper side of the first sliding portion 77, the sealing function of the second sliding portion 78, the sealing function of the O-rings 56 and 79 disposed on the lower side of the second sliding portion 78, and the sealing function of the O-ring 26 disposed radially outside of the annular flow passage 422. In this way, the second outer flow passage 32, the second communication flow passage 42, and the second inner flow passage 62 are included in one independent second fluid passage 12 through which the sealed fluid flows.

<Modification of Groove Flow Passage>

Figure 5:
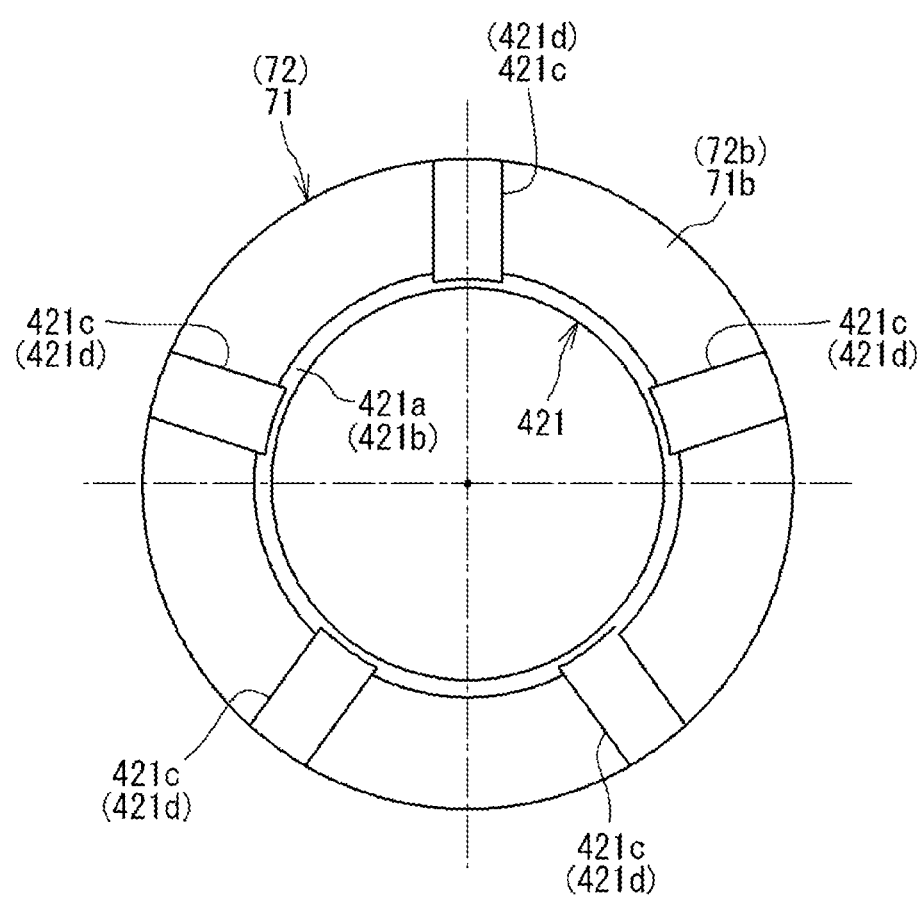
FIG. 5 is a front view of a shaft side seal ring including a modification of a groove flow passage.
Figure 6:
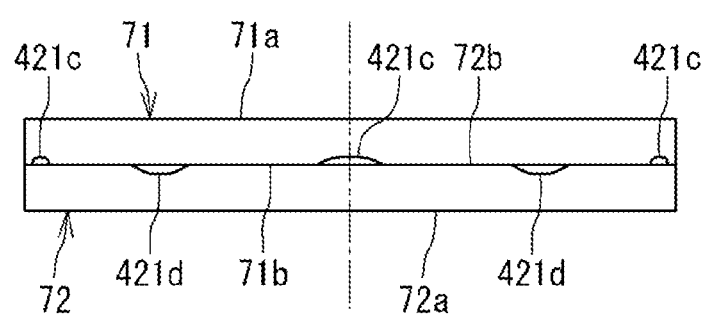
FIG. 6 is a plan view illustrating a state in which contact surfaces of shaft side seal rings of FIG. 5 are brought into contact with each other.

FIG. 5 is a front view of the shaft side seal ring 71 (72) including a modification of the groove flow passage 421 as viewed from the contact surface 71*b* (72*b*) side. FIG. 6 is a plan view illustrating a state in which the contact surfaces 71*b* and 72*b* of the shaft side seal rings 71 and 72 of FIG. 5 are brought into contact with each other. In FIGS. 5 and 6, in the groove flow passage 421 of this modification, a groove width of the groove 421*c* (421*d*) in the circumferential direction is formed wider than a groove width of the groove 421*c* (421*d*) of the above embodiment (see FIG. 3) in the circumferential direction. However, a groove depth of the groove 421*c* (421*d*) of this modification in the axial direction (vertical direction of FIG. 6) is formed to be the same as a groove depth of the groove 421*c* (421*d*) of the above embodiment (see FIG. 4) in the axial direction.

According to the groove 421*c* (421*d*) of this modification, even when the groove width is widened to increase the flow passage formed by each of the grooves 421*c* and 421*d*, since the groove depth does not become deep, it is possible to ensure the thickness of each of the shaft side seal rings 71 and 72 in the axial direction. As a result, it is possible to suppress occurrence of winding on the sealing surfaces 71*a* and 72*a* of the respective shaft side seal rings 71 and 72, and thus it is possible to suppress deterioration of the sealing performance of the second sliding portion 78.

Note that the groove width of the groove 421*c* (421*d*) may be wider than the groove width illustrated in FIG. 6. In this case, the groove width of the groove 421*c* (421*d*) can be widened until a ratio of the area occupied by the groove 421*c* (421*d*) on the contact surface 71*b* (72*b*) to the area occupied by a flat surface other than the groove 421*c* (421*d*) on the contact surface 71*b* (72*b*) becomes 1:1.

Figure 7:
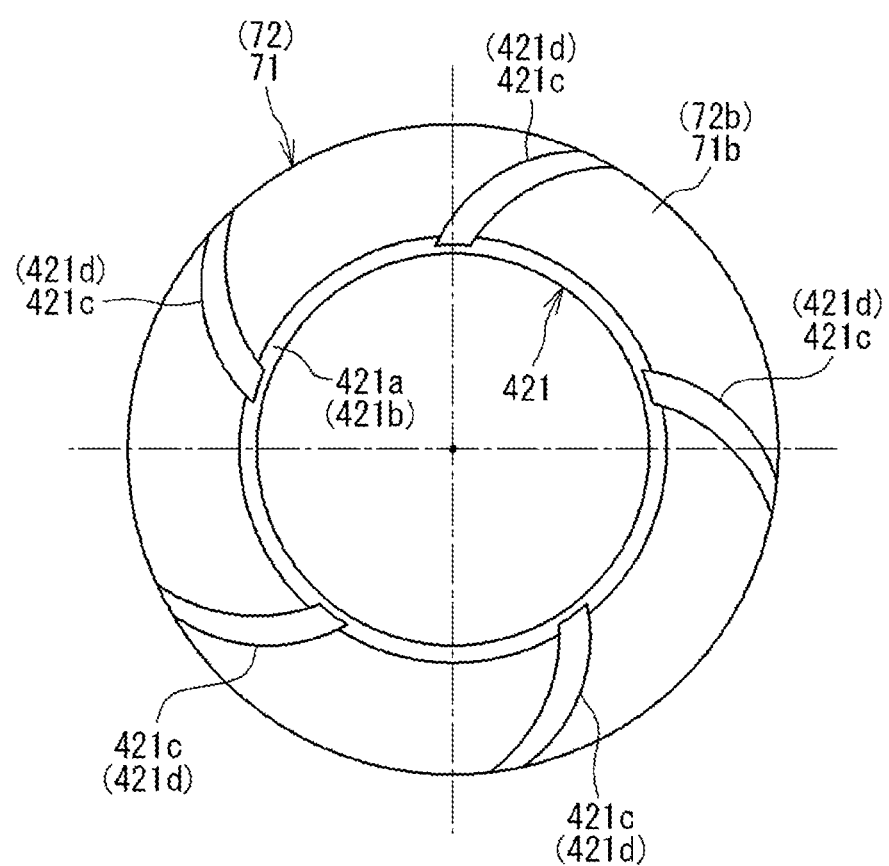
FIG. 7 is a front view of a shaft side seal ring including another modification of the groove flow passage.

FIG. 7 is a front view of the shaft side seal ring 71 (72) including another modification of the groove flow passage 421 as viewed from the contact surface 71*b* (72*b*) side. In FIG. 7, in the groove flow passage 421 of this modification, the groove 421*c* (421*d*) is formed to extend in an arc shape from the vicinity of the inner circumferential end of the contact surface 71*b* (72*b*) toward the outer circumferential end.

<Third Communication Flow Passage>

In FIG. 2, the mechanical seal device 7 disposed at the lowermost portion in the axial direction further has a third case side seal ring 82 attached to the case body 2 on the lower side of the second case side seal ring 74, a third shaft side seal ring 81 attached to the shaft body 5 adjacent to the lower side of the third case side seal ring 82, and a third coil spring 83 as a press member.

Similarly to the first and second shaft side seal rings 71 and 72, the third shaft side seal ring 81 is made of an annular member. The third shaft side seal ring 81 is integrally rotatably attached to the shaft body 5 and functions as a rotary seal ring. The lower end surface of the third shaft side seal ring 81 is in contact with the end surface of the large diameter portion 5*a* of the shaft body 5 (see FIG. 1). An annular sealing surface 81*a* is formed on the upper end surface of the third shaft side seal ring 81.

Similarly to the first and second case side seal rings 73 and 74, the third case side seal ring 82 is made of an annular member. A radial outer end portion of the third case side seal ring 82 is in contact with the pin 27 that protrudes in the axial direction (vertical direction) and is fixed at the protrusion 221 of the flow passage flange 22. In this way, the third case side seal ring 82 is stopped by the case body 2 and functions as a static seal ring. An annular sealing surface 82*a* in contact with the sealing surface 81*a* of the third shaft side seal ring 81 is formed on the lower end surface of the third case side seal ring 82.

The third coil spring 83 is inserted into a plurality of (only one is illustrated in the figure) insertion holes 222 formed in the circumferential direction in a compressed state at the protrusion 221 of the flow passage flange 22. One end portion of the third coil spring 83 is in contact with the third case side seal ring 82. In this way, due to the elastic restoring force of the third coil spring 83, the third case side seal ring 82 is pressed downward toward the third shaft side seal ring 81 side, and a pressing force in the axial direction acts between both the sealing surfaces 81*a* and 82*a*. Note that in addition to the third coil spring 83, another press member may be used.

As described above, as the shaft body 5 rotates with respect to the case body 2, the sealing surfaces 81*a* and 82*a* of the third shaft side seal ring 81 and the third case side seal ring 82 slide with each other in a state of being pressed in the axial direction. By sliding the sealing surfaces 81*a* and 82a together, a sealing function for preventing the sealed fluid from leaking from between both the sealing surfaces 81a and 82a is exhibited.

Therefore, a sealing function of the mechanical seal device 7 disposed at the lowermost portion is exhibited by a sliding action associated with relative rotation between the sealing surface 81a of the third shaft side seal ring 81 and the sealing surface 82a of the third case side seal ring 82. Hereinafter, a sliding portion between the sealing surfaces 81a and 82a is referred to as a third sliding portion 84.

The third case side seal ring 82 and the second case side seal ring 74 disposed on the upper side thereof are provided with a gap between the sleeve 52 and the case side seal rings. In this way, a cylindrical gap flow passage 43a through which the sealed fluid flows is formed between the case side seal rings 74 and 82 and the sleeve 52 adjacent to each other in the axial direction. The gap flow passage 43a communicates with each through-hole 41d of the sleeve 52 adjacent to the upper side of the third shaft side seal ring 81.

An annular flow passage 43b through which the sealed fluid flows is formed between the case side seal rings 74 and 82 adjacent to each other in the axial direction. The annular flow passage 43b connects the gap flow passage 43a on the inner side in the radial direction and the first outer flow passage 31 on the outer side in the radial direction. The O-ring 79 is provided between the outer circumferential surface of the third case side seal ring 82 and the inner circumferential surface of the protrusion 221 of the flow passage flange 22. Note that the third case side seal ring 82 is fit to the protrusion 221 via the O-ring 79 in a state of being movable in the axial direction.

As described above, the gap flow passage 43a, the annular flow passage 43b, the gap 41c, and the through-hole 41d between the second case side seal ring 74 and the third case side seal ring 82 of the mechanical seal device 7 at the lowermost portion are included in the third communication flow passage 43 connecting the first outer flow passage 31 at the lowermost portion and the first inner flow passage 61 at the lowermost portion. The sealed fluid in the third communication flow passage 43 does not leak to the outside by the sealing function of the second and third sliding portions 78 and 84 of the mechanical seal device 7 at the lowermost portion and the sealing function of the O-rings 56 and 79. In this way, the first outer flow passage 31 at the lowermost portion, the third communication flow passage 43, and the first inner flow passage 61 at the lowermost portion are included in one independent first fluid passage 11 through which the sealed fluid flows.

<Effect>

As described above, according to the rotary joint 1 of the present embodiment, the first shaft side seal ring 71 and the second shaft side seal ring 72 of each mechanical seal device 7 have the contact surfaces 71b and 72b facing in the axial direction and coming into contact with each other, and the grooves 421c and 421d for forming the second communication flow passage 42 connecting the second outer flow passage 32 and the second inner flow passage 62 are formed on these contact surfaces 71b and 72b. In this way, since it is unnecessary to provide a sleeve in which a through-hole is formed between the first shaft side seal ring 71 and the second shaft side seal ring 72 as in the conventional case, even when the number of second communication flow passages 42 (the number of ports) increases, it is possible to suppress an increase in the total length in the axial direction. Further, since the shaft side seal rings 71 and 72 having the contact surfaces 71b and 72b on which the grooves 421c and 421d are formed can be molded by a mold, respectively, the variation in the processing accuracy of the grooves 421c and 421d can be suppressed.

Further, since the grooves 421c and 421d are formed on both the contact surfaces 71b and 72b, respectively, one flow passage can be formed by disposing the grooves 421c and 421d formed on both contact surfaces 71b and 72b, respectively, at positions facing each other, or a flow passage can be formed for each of the grooves 421c and 421d by disposing the grooves 421c and 421d at positions not facing each other. Therefore, the degree of freedom in forming the second communication flow passage 42 can be increased.

In addition, when the sealed fluid is a gas, the first sliding portion 77 between the first shaft side seal ring 71 and the first case side seal ring 73, and the second sliding portion 78 between the second shaft side seal ring 72 and the second case side seal ring 74 are dry sliding, and these sliding portions 77 and 78 are likely to generate heat. On the other hand, in the present embodiment, since the grooves 421c and 421d formed on the both contact surfaces 71b and 72b, respectively, are disposed at positions not facing each other, and a flow passage is formed for each of the grooves 421c and 421d, more flow passages can be formed when compared to a case where the grooves 421c and 421d are disposed at positions facing each other. In this way, since the first shaft side seal ring 71 and the second shaft side seal ring 72 can be effectively cooled by the gas (sealed fluid) passing through the flow passage formed for each of the grooves 421c and 421d, it is possible to effectively suppress heat generation of the sliding portions 77 and 78.

Further, since the circumferential grooves 421a and 421b that communicate with the second inner flow passage 62 on the inner circumferential side and communicate with the grooves 421c and 421d on the outer circumferential side are formed on the contact surfaces 71b and 72b, even when the second inner flow passage 62 and the grooves 421c and 421d are disposed so as to be offset from each other in the circumferential direction, the circumferential grooves 421a and 421b can ensure communication between the second inner flow passage 62 and the grooves 421c and 421d.

Further, since a plurality of grooves 421c and 421d is formed in the circumferential direction of the contact surfaces 71b and 72b, and the outer circumferential side of the circumferential grooves 421a and 421b communicates with the plurality of grooves 421c and 421d, these plurality of grooves 421c and 421d can be allowed to communicate with the second inner flow passage 62 via the circumferential grooves 421a and 421b.

Second Embodiment

Figure 8:
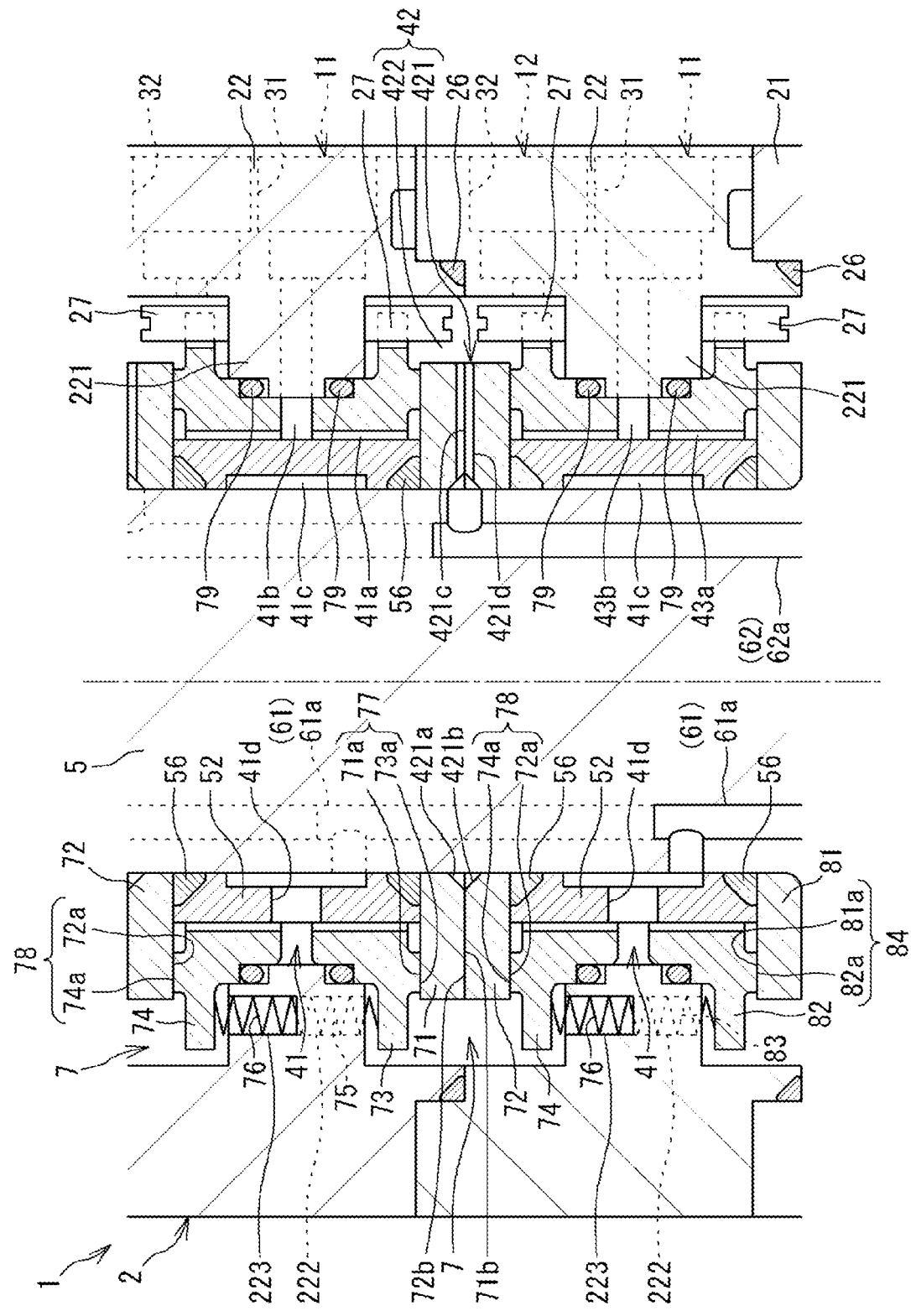
FIG. 8 is an enlarged cross-sectional view illustrating a lower side of a rotary joint according to a second embodiment of the invention.

FIG. 8 is an enlarged cross-sectional view illustrating a lower side of a rotary joint according to a second embodiment of the invention. The rotary joint 1 of the second embodiment is different from the first embodiment in that a fluid used as a sealed fluid is different and a configuration of a groove flow passage 421 of a second communication flow passage 42 is different.

In the present embodiment, as the sealed fluid, for example, a liquid such as polishing liquid, washing water, pure water, or polishing residual liquid is used.

Figure 9:
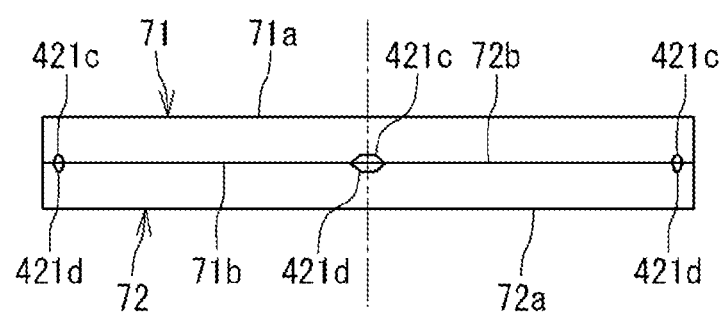
FIG. 9 is a plan view illustrating a state in which contact surfaces of shaft side seal rings of FIG. 8 are brought into contact with each other.

FIG. 9 is a plan view illustrating a state in which contact surfaces 71b and 72b of shaft side seal rings 71 and 72 of FIG. 8 are brought into contact with each other. As illustrated in FIGS. 8 and 9, in the groove flow passage 421 of the second communication flow passage 42 of the present embodiment, grooves 421c and 421d formed on the both contact surfaces 71b and 72b of the shaft side seal rings 71 and 72, respectively, are disposed at positions facing each other. Note that, for example, in the present embodiment, five grooves 421c and five grooves 421d are formed as in the first embodiment.

In this way, the groove flow passage 421 of the present embodiment includes one flow passage formed by circumferential grooves 421a and 421b facing each other, and a total of five flow passages formed by the grooves 421c and 421d facing each other.

In the rotary joint 1 configured as described above, when a case body 2 and a sleeve 52 are made of synthetic resin, the case body 2 and the sleeve 52 are easily deformed. For this reason, when a through-hole 41d formed in the sleeve 52 and a flow passage formed by the circumferential grooves 421a and 421b of the shaft side seal rings 71 and 72 facing each other are disposed so as to coincide with each other in the circumferential direction, there is concern that a surface pressure may be biased in the circumferential direction of the first sliding portion 77 and the second sliding portion 78, and the sealing performance may deteriorate. For this reason, when the case body 2 and the sleeve 52 are made of synthetic resin, in order to disperse the surface pressure of the first sliding portion 77 and the second sliding portion 78 in the circumferential direction, it is preferable that the through-hole 41d and the flow passage are disposed so as to be shifted in the circumferential direction.

Note that since the other configurations of the present embodiment are the same as those of the first embodiment, the same reference symbols are given and the description thereof will be omitted. Further, the grooves 421c and 421d of the groove flow passage 421 of the second embodiment may be formed in the shape illustrated in the modification of FIG. 5 or FIG. 7.

As described above, in the rotary joint 1 of the present embodiment, in the first shaft side seal ring 71 and the second shaft side seal ring 72 of each mechanical seal device 7, the grooves 421c and 421d for forming the second communication flow passage 42 connecting the second outer flow passage 32 and the second inner flow passage 62 are formed on the contact surfaces 71b and 72b in contact with each other in the axial direction. In this way, since it is unnecessary to provide a sleeve in which a through-hole is formed between the first shaft side seal ring 71 and the second shaft side seal ring 72 as in the past, even when the number of second communication flow passages 42 (the number of ports) increases, it is possible to suppress an increase in the total length in the axial direction. Further, since the shaft side seal rings 71 and 72 having the contact surfaces 71b and 72b on which the grooves 421c and 421d are formed can be molded by a mold, respectively, the variation in the processing accuracy of the grooves 421c and 421d can be suppressed.

Further, when the sealed fluid is a liquid, the pressure loss of the liquid flowing through the second communication flow passage 42 becomes large. On the other hand, in the present embodiment, since the grooves 421c and 421d formed on the both contact surfaces 71b and 72b, respectively, are disposed at positions facing each other, and the grooves 421c and 421d mutually form one large flow passage, it is possible to increase the area of the wetting surface of the flow passage. In this way, it is possible to suppress the pressure loss of the fluid flowing through the second communication flow passage 42.

[Others]

The rotary joint 1 in each of the embodiments may be disposed upside down in the axial direction, or may be disposed so that the axial direction is a horizontal direction. Further, the rotary joint 1 can be applied to other devices such as a sputtering device and an etching device in addition to the CMP device. Further, the rotary joint 1 is not limited to use in a semiconductor field.

In each of the embodiments, the case body 2 is attached to the fixed side member, and the shaft body 5 is attached to the rotating side member. However, the case body 2 may be attached to the rotating side member, and the shaft body 5 may be attached to the fixed side member.

The mechanical seal device 7 disposed at the lowermost portion may not include the third shaft side seal ring 81 and the third case side seal ring 82.

In the first embodiment, the grooves 421c and 421d formed on the both contact surfaces 71b and 72b of the shaft side seal rings 71 and 72 are disposed at positions not facing each other. However, as in the second embodiment, the grooves may be disposed at positions facing each other.

In the second embodiment, the grooves 421c and 421d formed on the both contact surfaces 71b and 72b of the shaft side seal rings 71 and 72 are disposed at positions facing each other. However, as in the first embodiment, the grooves may be disposed at positions not facing each other.

In each of the embodiments, the grooves 421c and 421d are formed on the both contact surfaces 71b and 72b of the shaft side seal rings 71 and 72, respectively. However, the groove 421c may be formed only on one contact surface 71b, or the groove 421d may be formed only on the other contact surface 72b.

Further, the number of grooves 421c and 421d may be one or more. However, from a viewpoint of suppressing winding occurring on the sealing surfaces 71a and 72a of the shaft side seal rings 71 and 72, it is preferable that there are two or more grooves 421c and 421d.

In each of the embodiments, the circumferential grooves 421a and 421b are formed on the contact surfaces 71b and 72b of the shaft side seal rings 71 and 72. However, when there is a gap through which the sealed fluid flows between the outer circumferential surface of the shaft body 5 and the shaft side seal rings 71 and 72, it is unnecessary to form the circumferential grooves 421a and 421b. However, in the second embodiment, from a viewpoint of suppressing the pressure loss of the liquid (sealed fluid), it is preferable to form the circumferential grooves 421a and 421b even when there is the gap.

In each of the embodiments, the circumferential grooves 421a and 421b are formed on the both contact surfaces 71b and 72b of the shaft side seal rings 71 and 72, respectively. However, the circumferential groove 421a may be formed only on one contact surface 71b, or the circumferential groove 421b may be formed only on the other contact surface 72b. At that time, a circumferential groove may be formed on a contact surface where no groove is formed. For example, when the groove 421c is formed only on one contact surface 71b, the circumferential groove 421b may be formed only on the other contact surface 72b. In this case, it suffices that the groove 421c and the circumferential groove 421b communicate with each other in a state where both the contact surfaces 71b and 72b are in contact with each other.

The embodiments disclosed this time should be considered to be exemplary and not restrictive in all respects. The scope of the invention is indicated by the claims rather than the above meaning, and is intended to include meanings equivalent to the claims and all modifications within the scope.

REFERENCE SIGNS LIST 1 rotary joint
2 case body
5 shaft body
7 mechanical seal device
32 second outer flow passage (outer flow passage)
42 second communication flow passage (communication flow passage)
62 second inner flow passage (inner flow passage)
71 first shaft side seal ring
71b contact surface
72 second shaft side seal ring
72b contact surface
73 first case side seal ring
74 second case side seal ring
421a circumferential groove
421b circumferential groove
421c groove
421d groove
A annular space

The invention claimed is:

1. A rotary joint comprising:

a tubular case body in which a plurality of outer flow passages is formed by opening on an inner circumferential side, a sealed fluid flowing through the outer flow passages;

a shaft body relatively rotatably provided in the case body, a plurality of inner flow passages through which a sealed fluid flows being formed therein by opening on an outer circumferential side; and a plurality of mechanical seal devices disposed side by side in an axial direction in an annular space formed between the case body and the shaft body, wherein each of the mechanical seal devices includes a first case side seal ring attached to the case body, a first shaft side seal ring attached adjacent to one side of the first case side seal ring in the axial direction in the shaft body to slide relative to the first case side seal ring, a second shaft side seal ring attached adjacent to one side of the first shaft side seal ring in the axial direction in the shaft body, and a second case side seal ring attached adjacent to one side of the second shaft side seal ring in the axial direction in the case body to slide relative to the second shaft side seal ring, the first shaft side seal ring and the second shaft side seal ring have contact surfaces facing in the axial direction and coming into direct contact with each other, a groove for forming a communication flow passage connecting one of the outer flow passages and one of the inner flow passages is formed on at least one of the both contact surfaces of the first shaft side seal ring and the second shaft side seal ring, and the groove is formed on each of the both contact surfaces.

2. The rotary joint according to claim 1, wherein the sealed fluid is a gas, and the grooves formed on the both contact surfaces, respectively, are disposed at positions not facing each other.

3. The rotary joint according to claim 1, wherein the sealed fluid is a liquid, and the grooves formed on the both contact surfaces, respectively, are disposed at positions facing each other.

4. The rotary joint according to claim 1, wherein a circumferential groove for forming the communication flow passage is formed on the contact surface, the circumferential groove communicating with the one of the inner flow passages on the inner circumferential side and communicating with the groove on the outer circumferential side.

5. The rotary joint according to claim 4, wherein a plurality of grooves is formed in a circumferential direction of the contact surface, and an outer circumferential side of the circumferential groove communicates with the plurality of grooves.

* * * * *